United States Patent
Yablokov et al.

(10) Patent No.: US 10,691,801 B2
(45) Date of Patent: Jun. 23, 2020

(54) SYSTEM AND METHOD OF TERMINATION OF A FUNCTIONALLY-LIMITED APPLICATION INTERRELATED WITH A WEBSITE AND STARTED WITHOUT INSTALLATION

(71) Applicant: AO KASPERSKY LAB, Moscow (RU)

(72) Inventors: Victor V. Yablokov, Moscow (RU); Anton S. Samoylov, Moscow (RU); Alexander Y. Shindin, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 245 days.

(21) Appl. No.: 15/960,956

(22) Filed: Apr. 24, 2018

(65) Prior Publication Data
US 2019/0243973 A1  Aug. 8, 2019

(30) Foreign Application Priority Data
Feb. 6, 2018 (RU) ................ 2018104433

(51) Int. Cl.
*G06F 21/56* (2013.01)
*G06F 21/55* (2013.01)

(52) U.S. Cl.
CPC ........ *G06F 21/566* (2013.01); *G06F 21/554* (2013.01); *G06F 21/567* (2013.01); *G06F 2221/033* (2013.01)

(58) Field of Classification Search
CPC ........ G06F 21/554; G06F 21/566–567; G06F 2221/033
See application file for complete search history.

(56) References Cited

U.S. PATENT DOCUMENTS

| | | | |
|---|---|---|---|
| 9,280,679 B2 | 3/2016 | Nicolaou | |
| 9,596,257 B2 | 3/2017 | Das et al. | |
| 2004/0199827 A1 | 10/2004 | Muttik et al. | |
| 2012/0222120 A1 | 8/2012 | Rim et al. | |
| 2015/0121083 A1 | 4/2015 | Zhang | |
| 2017/0346853 A1 | 11/2017 | Wyatt et al. | |
| 2018/0060584 A1* | 3/2018 | Ahuwanya | G06F 21/566 |

FOREIGN PATENT DOCUMENTS

EP   1710724 A2   10/2006

OTHER PUBLICATIONS https://www.androidauthority.com/android-instant-apps-693316/ Android Authority. Android Instant Apps: what do they mean for users and developers? Feb. 17, 2018.

(Continued)

*Primary Examiner* — Minh Dinh
(74) *Attorney, Agent, or Firm* — Patterson Thuente Pedersen, P.A.

(57) ABSTRACT

Systems and methods for limiting applications launched without installation for the presence of malicious code. Applications launched without installation and which contain malicious code can be stopped or paused. Relationships between a fully-functional website-related application requiring installation and a functionally-restricted application launched without installation can be used to determine malicious code.

19 Claims, 6 Drawing Sheets

(56) References Cited

OTHER PUBLICATIONS https://www.tomsguide.com/us/android-instant-apps-yikes,news-22692.html Wagenseil, et al., Tom's Guide "Androld:Instant Apps Sounds Dangerous" Dated May 18, 2016.
https://www.nowsecure.com/blog/2016/05/19/android-instant-apps-the-security-jury-is-out/ NowSecure, "Andoird Instant App: The security jury is out" © 2016.
https://www.wired.com/story/google-play-store malware/ Newman et al., WIRED, "How Malware Keeps Sneaking Past Google Play's Denfenses", Sep. 22, 2017.
https://developer.android.com/studio/write/app-link-indexing.html DEVELOPERS. Add Android App Links last updated Apr. 16, 2018.
https://developers.google.com/digital-asset-links/v1/getting-started Google Digital Asset Links. Getting Started. Last updated Jul. 14, 2016.
https://developer.android.com/topic/instant-apps/prepare.html DEVELOPERS. Preparing your app for Instant Apps. Last updated Apr. 23, 2018.
https://developer.android.com/topic/instant-apps/getting-started/structure.html DEVELOPERS. Project structure of Instant Apps. Last updated Apr. 18, 2018.
https://developer.android.com/topic/instant-apps/ux-best-practices.html#instant-v-installed DEVELOPERS. Best practices for user experience. Last updated Apr. 18, 2018.
https://developer.android.com/studio/build/build-variants.html#product-flavors DEVELOPERS. Configure Build Variants. Last updated Apr. 25, 2018.
https://developer.android.com/reference/android/view/accessibility/package-summary.html DEVELOPERS. android.view.accessibiliey. Last updated Apr. 17, 2018.
https://developer.android.com/guide/components/intents-filters.html DEVELOPERS. Intents and Intent Filters. Last updated Apr. 25, 2018.

* cited by examiner

SYSTEM AND METHOD OF TERMINATION OF A FUNCTIONALLY-LIMITED APPLICATION INTERRELATED WITH A WEBSITE AND STARTED WITHOUT INSTALLATION

RELATED APPLICATION

This application claims the benefit of Russian Application No. 2018104433, filed Feb. 6, 2018, which is fully incorporated by reference herein.

TECHNICAL FIELD

The invention relates to computer security, and more specifically, to systems and methods for checking applications that can be launched without installation for malicious code.

BACKGROUND

The number of websites and services provided by websites is continuously growing. With the development of operating systems (OSs) on mobile computer systems, for many websites, versions having reduced functionality have been created which are adapted to be run on those mobile computer systems. Various functionalities that were restricted in the website version for mobile computer systems are often provided in separate applications for mobile computer systems.

Further development of OSs on mobile computer systems have allowed the creation of a relation between hyperlinks to web pages and individual features of an application; for example, using the App Link technology. In this case, the use of individual features of an application is possible only when the application is installed. Subsequently, the need for installation of applications has been questioned. Accordingly, a mobile application can be divided into parts, depending on the various features provided. This resulted in the creation, for each individual feature, of individual applications downloaded and launched without installation. In one example, this technology was presented by GOOGLE as Instant App.

On one hand, this has resulted in the optimization to use features of a website. However, any malicious application created using the Instant App technology is now able to take malicious actions without installation.

Currently, there are no solutions designed to analyze and detect malicious applications created using GOOGLE Instant App technology.

SUMMARY

Embodiments solve the problems described above to analyze and detect malicious applications that can be launched without installation.

In an embodiment, a system for detecting malicious code for a functionally-restricted website-related application launched without installation on a mobile device comprises a computing platform including computing hardware of at least one processor and memory operably coupled to the at least one processor; instructions that, when executed on the computing platform, cause the computing platform to implement: a detection tool configured to detect activity of an operating system (OS) service related to the functionally-restricted website-related application launched without installation, and determine at least one parameter of the functionally-restricted website-related application launched without installation; a determination tool configured to receive the at least one parameter of the functionally-restricted website-related application launched without installation from the detection tool, and determine a corresponding fully-functional application requiring installation based on the at least one parameter of the functionally-restricted website-related application launched without installation; a check tool configured to receive information about the corresponding fully-functional application requiring installation from the determination tool, check for malicious code in the corresponding fully-functional application requiring installation from the determination tool based on the information received from the determination tool, and stop the launch of the functionally-restricted website-related application when the check for malicious code identifies malicious code.

In an embodiment, a method for detecting malicious code for a functionally-restricted website-related application launched without installation on a mobile device comprises detecting launch of the functionally-restricted website-related application; determining at least one parameter of the functionally-restricted website-related application launched without installation; determining a corresponding fully-functional application requiring installation based on the at least one parameter of the functionally-restricted website-related application launched without installation; checking for malicious code in the corresponding fully-functional application requiring installation; and stopping the launch of the functionally-restricted website-related application.

In an embodiment, a method of suspending a functionally-restricted website-related application launched without installation on a mobile device comprises detecting launch of the functionally-restricted website-related application on the mobile device; pausing the functionally-restricted website-related application; determining at least one characteristic of the functionally-restricted website-related application; resuming the functionally-restricted website-related application based on the determined at least one characteristic.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
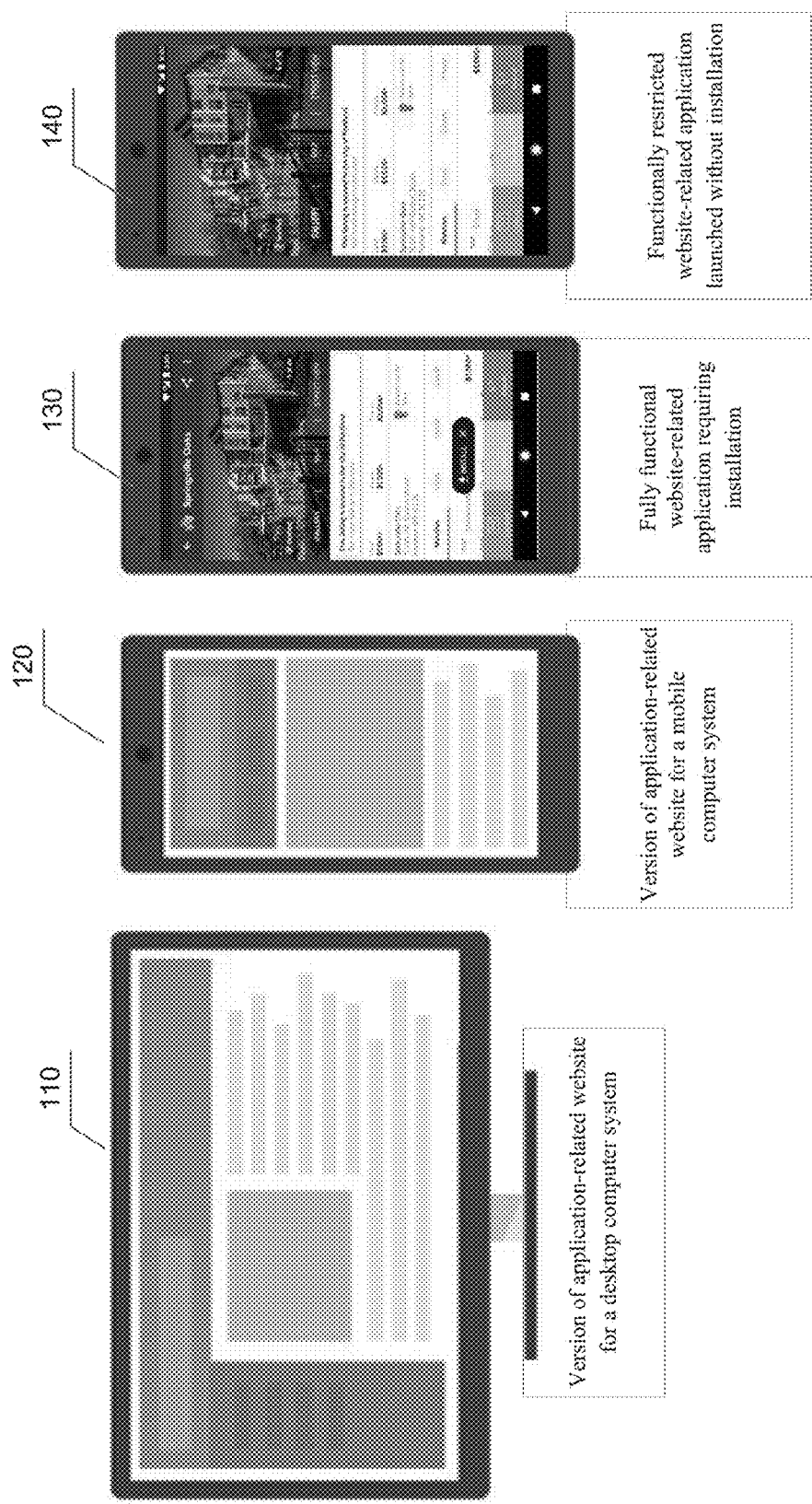
FIG. 1 is a block diagram of a website related to an application, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The objects and characteristics of this invention and the methods for achieving these objects and characteristics will become clear by reference to example embodiments. However, this invention is not limited to the example embodiments disclosed herein and can be implemented in various forms. The substance provided in the description represents nothing else than specific details required in order to help one skilled in the art fully understand the invention; this invention is defined within the scope of the enclosed claims.

As referenced throughout this disclosure, certain terms will be readily understood by one of skill in the art. For example, a website can comprise a set of web pages combined thematically, belonging to a single author, organization or user, or to a computer (a network node), storing certain information and accessible through the Internet.

An applied program (application) can be a program designed to accomplish a task or a class of tasks in a certain field of information processing system use.

Referring to FIG. 1, a block diagram of a website related to an application is depicted, according to an embodiment.

Generally, an application-related website can include an application-related website version for a desktop computer system 110, an application-related website version for a mobile computer system 120, a fully functional application requiring installation and related to a web site 130, and a functionally restricted application launched without installation and related to a web site 140.

The website version for a desktop computer system 110 is a standard version—a website designed to perform a specified list of applied tasks, in accordance with the website's purpose; for example, to book a hotel, to find and display news on specific subjects, etc.

The website version for a mobile computer system 120 is a mobile computer system-adapted version of the website for a desktop computer system 110, which does not perform the applied tasks not accessible for implementation due to mobile computer system OS security requirements.

The fully-functional application requiring installation and related to a web site 130 comprises one or more applications for the OS of a mobile computer system requiring installation in order to be launched. These applications are usually created to implement the solution of a specified list of applied tasks; in particular, tasks which cannot be solved in the mobile computer system website version 120 (https://developer.android.com/studio/write/app-link-indexing.html). The website can be related to various applications by publishing a file named assetlinks.json, which contains information on the applications that can be launched upon accessing the website's links. The fully-functional application requiring installation 130 can be related to various websites, by specifying on the Application Manifest the websites which can launch applications once their URL is opened (https://developers.google.com/digital-asset-links/v1/getting-started). The presence of a record of application A in the assetlinks.json file of website A and the presence of a record of website A on the application A's manifest allow to consider application A to be related to website A and to consider website A to be related to the application A.

The functionally-restricted website-related application launched without installation 140 is a modified version of the fully functional application requiring installation 130. Functionally-restricted website-related application launched without installation 140 is designed so as to allow implementation of the performance of one or multiple main applied tasks and to ensure launch without the installation procedure required by the OS. For example, GOOGLE has provided developer documentation to aid in functionally-restricted app development. (https://developer.android.com/topic/instant-apps/prepare.html; https://developer.android.com/topic/instant-apps/getting-started/structure.html).

The fully functional application requiring installation 130 and the corresponding functionally restricted application 140 can have a number of similar parameters, for example, a unique Application ID, and are versions of the same application. (https://developer.android.com/topic/instant-apps/ux-best-practices.html#instant-v-installed, https://developer.android.com/studio/buildibuild-variants.html#product-flavors). One fully-functional application requiring installation can correspond to multiple functionally-restricted applications; for example, when a separate functionally restricted application is created in order to ensure the performance of each applied task.

A website can be related to multiple applications—for example, when the website additionally uses a ready-to-use solution of an applied task. In an embodiment, one of the website sections can play a video of a certain format which can be played in a mobile computer system OS using only one application. Various versions can be created for such applications; one of which can be a functionally-restricted application related to the website. Similarly, a single application and its functionally-restricted version can be related to multiple websites.

Offenders can take advantage of the launching of the application and executing of application features without installation. In order to prevent the malicious use of applications launched without installation, systems and methods for limiting (including stopping or terminating) functionally-restricted website-related applications launched without installation are described herein.

Figure 2:
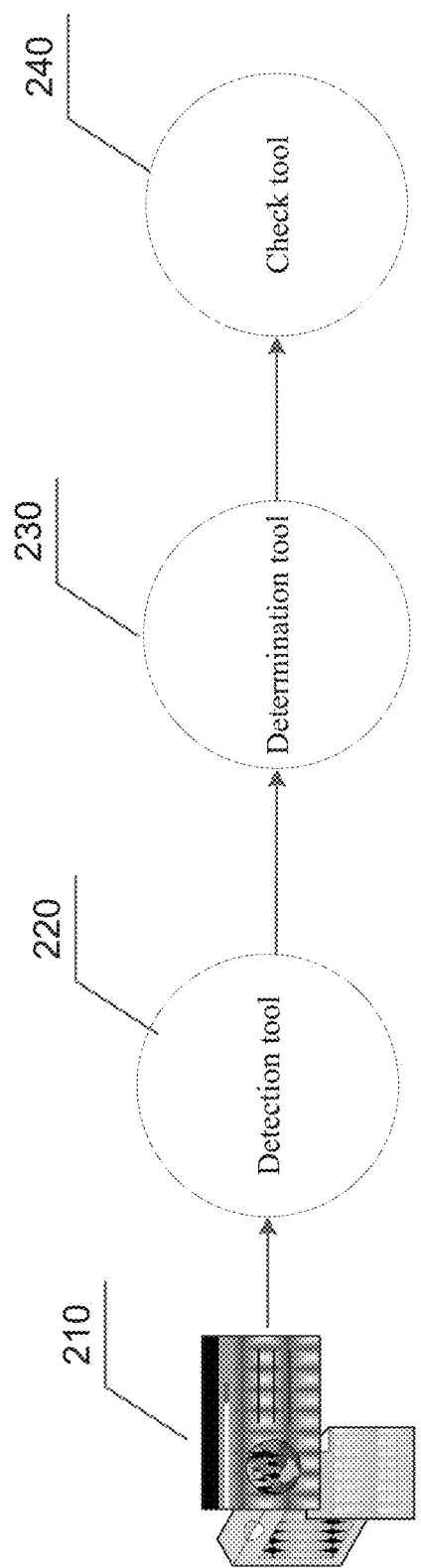
FIG. 2 is a block diagram of a system for stopping functionally-restricted website-related applications launched without installation, according to an embodiment.

For example, referring to FIG. 2, a block diagram of a system for stopping functionally-restricted website-related applications launched without installation is depicted, according to an embodiment. In an embodiment, the system can include a detection tool 220, a determination tool 230, and a check tool 240.

The detection tool 220 is configured to detect a launch of a functionally-restricted website-related application without its installation to a mobile computer system. The detection of a launch of a functionally restricted application launched without installation can be performed by detecting the activity of the OS service designed to work with functionally restricted applications launched without installation (in Android OS, Google Play services for Instant Apps). Activity can be detected using an Accessibility API, (https://developer.android.com/reference/androidiview/accessibility/package-summary.html).

In one embodiment, for example, in Android OS, activity of the OS service designed to work with functionally-restricted applications is detected by taking the following actions. First, the event is detected. In an example, AccessibilityEvent.TYPE_WINDOW_CONTENT_CHANGED, which shows a change in the system displayed on the screen and caused by the operation of one of the applications is identified or detected. Then, as a result of running the system application Supervisor or Play Store, the event is checked for the presence of attributes event.getPackageName( ).equals("com.android.vending") or event.getPackageName( ).equals("com.google.android.instantapps.supervisor"). Based on the result, presence of URL_view or App_name text fields is determined. In an embodiment, the detection tool 220 functionality or operational code can be performed by an anti-virus program pre-installed in the mobile computer system.

In addition, the detection tool 220 is configured to determine the parameters of the detected functionally-restricted application and to send the parameters of the detected functionally restricted application to the determination tool 230.

Parameters of the detected application can include the name of the file storing application resources, the URL of the website related to the application, and/or the name of the container file of the functionally-restricted application. Accordingly, the text in the URL_view field can contain symbols corresponding to the URL of the website to which the detected functionally-restricted application is related, while the App_name field contains the corresponding container file name.

The detection tool 220 can be additionally configured to suspend the launch of the detected functionally-restricted application—for example, until the end of the check for malicious code. In an embodiment, the launch or termination of the detected application can be stopped by an installed anti-virus program using an Accessibility API, by simulating depression of the Home key—performGlobalAction (GLOBAL_ACTION_HOME).

The determination tool 230 is configured to determine the fully-functional application requiring installation that corresponds to the detected functionally-restricted application based on the parameters determined for the functionally-restricted application.

The fully-functional application requiring installation that corresponds to the functionally-restricted application is determined by analyzing the determined parameters of the detected functionally-restricted application. In an embodiment, the accessible assetlinks.json file of the website related to the functionally-restricted application whose launch was detected can be analyzed. During the analysis, the above-mentioned website file is searched for the name of container files of all applications related to the website. Then, using the name of the container file in an applications database, for example, in the Play Store application store, access is gained to the data about the application, namely, to the container file body and to the files of all versions of the detected application; one of them will be the corresponding fully-functional application requiring installation.

The determination tool 230 is further configured to send data about the determined fully-functional application requiring installation to the check tool 240.

The check tool 240 is configured to check for the presence of malicious code in the determined fully-functional application requiring installation.

A check for the presence of malicious code can be made in all files and resources of the determined fully-functional application requiring installation. The check for presence of malicious code can be made in advance, before the detection of the launch of a functionally-restricted application. For example, an anti-virus server can perform a search of websites related to applications. An anti-virus server can, by browsing all URLs of a random website, record the URLs which, once accessed, cause the launch of a functionally-restricted application. The discovered applications can be checked, and the result of the check can be saved in the database of the anti-virus server and used later.

In an embodiment, in the Android OS, under the rules for the creation of functionally-restricted applications launched without installation, the program code of the functionally-restricted application must correspond to the program code of the fully-functional application requiring installation; specifically, the portion of applied tasks, and constitutes a version thereof. Therefore, a check for presence of malicious code in the fully-functional application requiring installation is sufficient to determine the maliciousness of any corresponding functionally-restricted application.

In another embodiment, the possibility exists that a functionally-restricted application launched without installation containing malicious code can be created in a different project. In such embodiments, the application can forcefully record its correspondence to a fully-functional application requiring installation, which does not contain malicious code. In such scenarios, all versions of the application and resources which are stored in the container file and have the same unique Application ID can be checked for malicious code.

In yet another embodiment, the possibility exists that a website-related application can be replaced with an application containing malicious code. In such embodiments, during the check for malicious code, the presence of any changes in the relations between the website and the applications is taken into account. For example, the date of the update and the content of the website's assetlinks.json file are analyzed. The results of the analysis allow for a determination of the integrity and relative correctness of the relation between the website, the functionally-restricted website-related application launched without installation, and the fully-functional website-related application requiring installation. In addition, the check tool 240 is configured to stop the running of a detected functionally-restricted application upon detection of malicious code, after detecting the launch of such applications.

The running of a detected functionally restricted application, the launch of which was detected, can be stopped by deleting temporary data necessary for the correct running of the functionally-restricted application. If no malicious code was detected, the detected functionally-restricted application is re-launched. The re-launch can be made by executing the Intent, containing a communication at the detected URL of the website related to the detected application (https://developer.android.com/guide/components/intents-filters.html).

Figure 3:
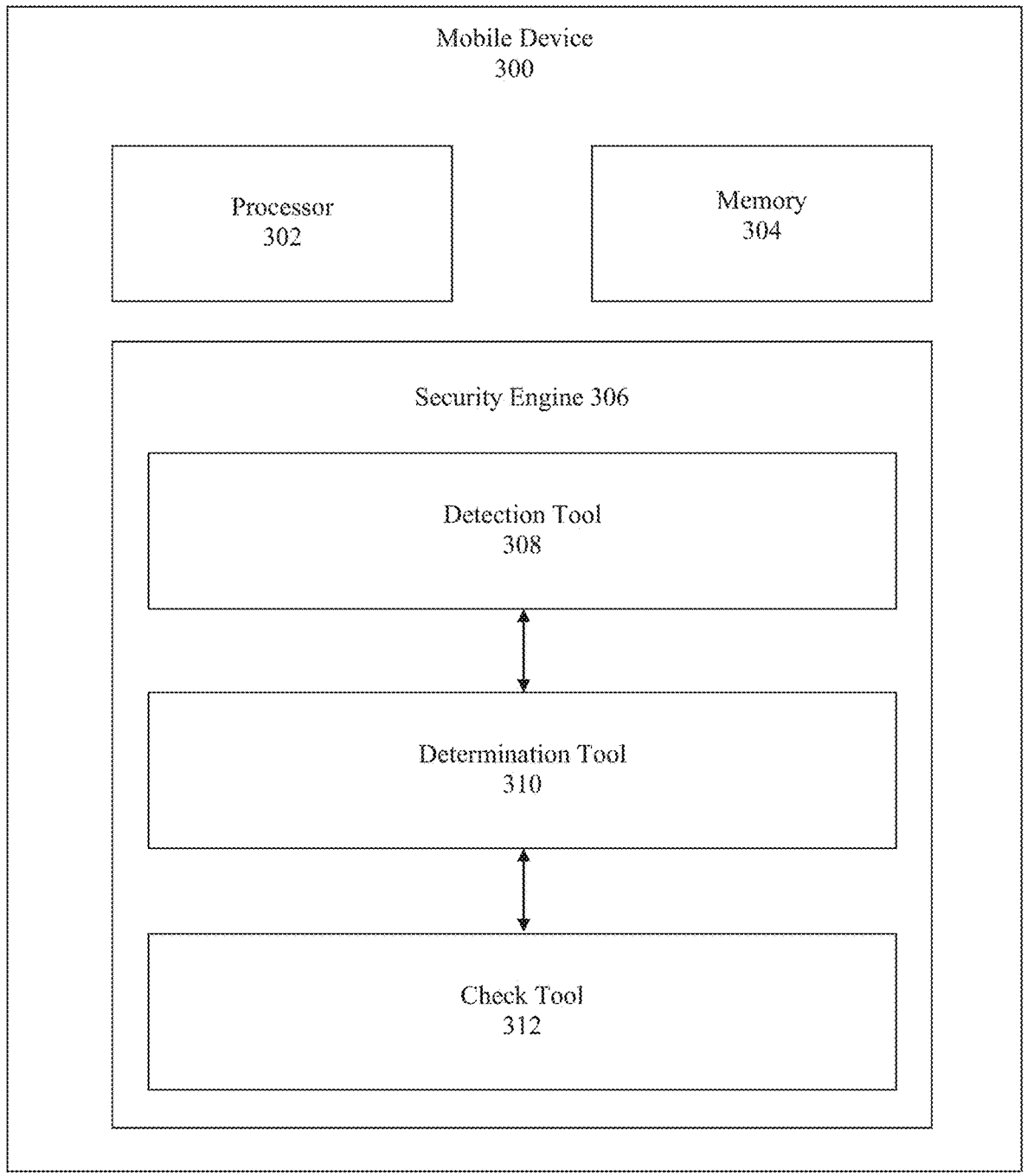
FIG. 3 is a block diagram of a mobile device implementing a system for stopping functionally-restricted website-related applications launched without installation, according to an embodiment.

Referring to FIG. 3, a block diagram of a mobile device 300 implementing a system for stopping functionally-restricted website-related applications launched without installation is depicted, according to an embodiment. In an embodiment, mobile device 300 generally comprises processor 302, memory 304, and security engine 306.

As will be readily understood by one of skill in the art, the subsystems of security engine 306 can be implemented by the at least one processor 302 and operably coupled memory 304.

The processor 302 can be any programmable device that accepts digital data as input, is configured to process the input according to instructions or algorithms, and provides results as outputs. In an embodiment, the processor 302 can be a central processing unit (CPU) configured to carry out the instructions of a computer program. The processor 302 is therefore configured to perform at least basic arithmetical, logical, and input/output operations.

The memory 304 operably coupled to the processor 302 can comprise volatile or non-volatile memory as required by the coupled processor 302 to not only provide space to execute the instructions or algorithms, but to provide the space to store the instructions themselves. In embodiments, volatile memory can include random access memory (RAM), dynamic random-access memory (DRAM), or static random-access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Some of the subsystems of security engine 302 includes various engines or tools, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

The security engine 306 implements all of the detection tool 308, the determination tool 310, and the check tool 312 on the mobile device 300. In embodiments, the detection tool 308, the determination tool 310, and the check tool 312 are substantially similar to the detection tool 220, the determination tool 230, and the check tool 240 as described above with respect to FIG. 2. For example, each of the detection tool 308, determination tool 310, and check tool 312 can be executed by processor 302 with operably coupled memory 304. In an embodiment, security engine 306 can be a self-contained anti-virus program installed in the mobile device 300.

Figure 4:
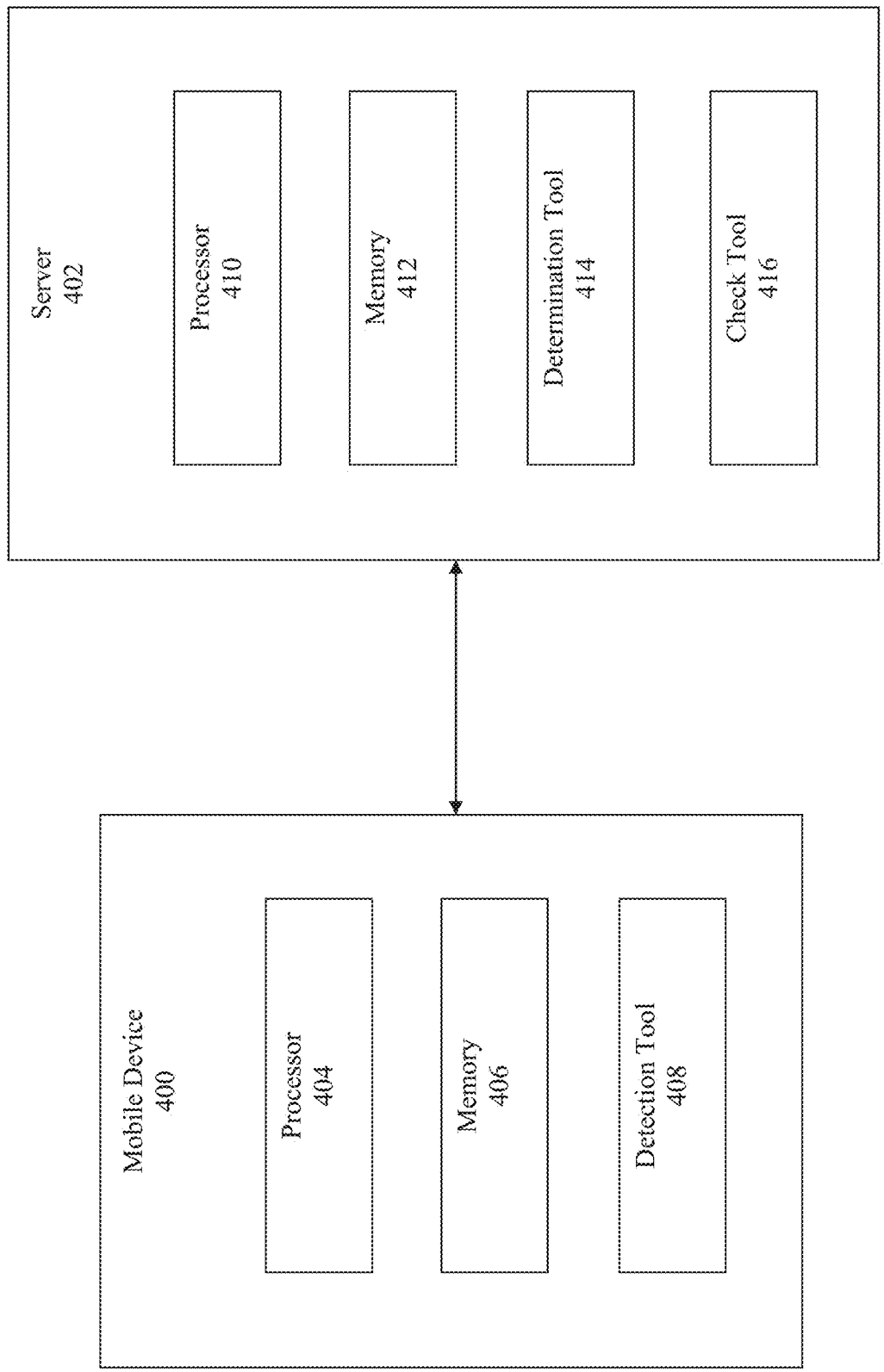
FIG. 4 is a block diagram of a mobile device and server implementing a system for stopping functionally-restricted website-related applications launched without installation, according to an embodiment.

In contrast, referring to FIG. 4, a block diagram of a mobile device 400 and server 402 can likewise implement a system for stopping functionally-restricted website-related applications launched without installation is depicted, according to an embodiment. In an embodiment, the mobile device 400 generally comprises a processor 402, a memory 404, and a detection tool 408. In embodiments, the processor 404 and the memory 406 can be substantially similar to the processor 302 and the memory 304, respectively. Likewise, the detection tool 408 can be substantially similar to detection tool 308.

However, the functionality of the determination and check tools is provided by server 402. For example, server 402 comprises processor 410 and operable coupled memory 412. The determination tool 414, and the check tool 416 can be executed by the processor 410 with the operably coupled memory 412. In certain embodiments, the memory 412 can comprise a database. In other embodiments, the server 402 itself can be operable coupled to an external database of data utilized by the determination tool 414 and the check tool 416.

In operation, the detection tool 408 can detect a launch of a functionally-restricted website-related application without its installation on the mobile device 400 and determine the parameters of the detected functionally-restricted application. The detection tool 408 can send the parameters to the determination tool 414 on server 402 over a network connection. The determination tool 414 can determine the corresponding fully-functional application requiring installation and send data about the determined fully-functional application requiring installation to the check tool 416. Based on that data, the check tool 416 can check for the presence of malicious code in the determined fully-functional application requiring installation. If malicious code is detected, the check tool 416 can command the detection tool 408 to suspend the launch of the detected functionally-restricted application.

Figure 5:
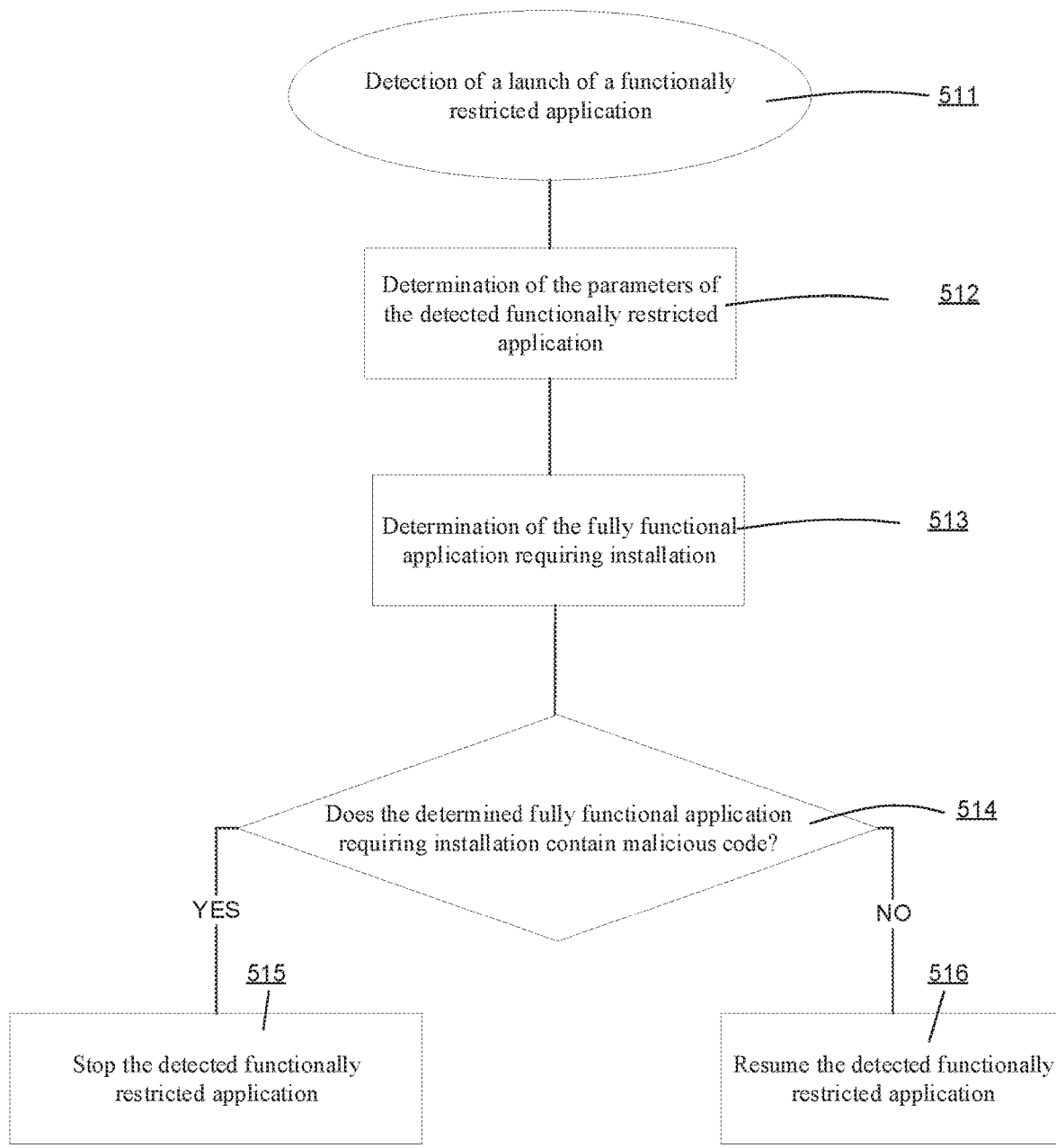
FIG. 5 is a flowchart of a method for stopping functionally-restricted website-related applications launched without installation, according to an embodiment.

Referring to FIG. 5, a flowchart of a method for stopping functionally-restricted website-related applications launched without installation is depicted, according to an embodiment. The method comprises, at 511, the detection tool 220 detects a launch of a functionally-restricted website-related application without its installation to a mobile computer system. At 512, the detection tool 220 determines the parameters of the detected functionally-restricted application and sends the determined parameters of the detected functionally-restricted application to the determination tool 230. At 513, the determination tool 230, on the basis of the determined parameters of the detected functionally-restricted application, determines the fully-functional application requiring installation, which corresponds to the detected functionally-restricted application, and sends information about the determined fully functional application requiring installation to the check tool 240. At 514, the check tool 240 performs a check for presence of malicious code in the determined fully-functional application requiring installation. If malicious code is found at 515, the check tool 240 stops or pauses the launch of the detected functionally-restricted application, the launch of which was detected. If no malicious code is present at 516, the check tool 240 resumes the launch of the detected functionally-restricted application.

Figure 6:
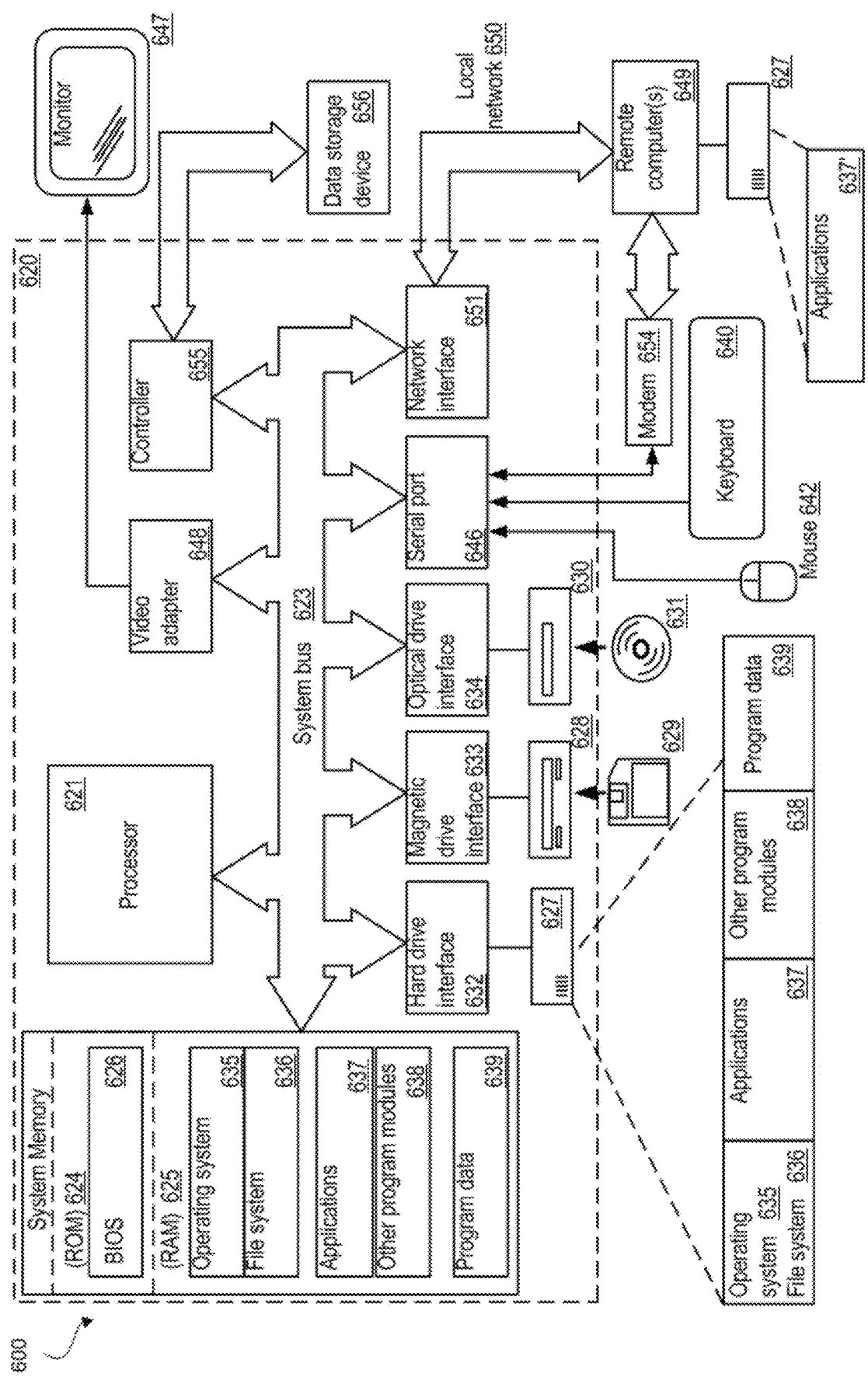
FIG. 6 is a block diagram of a computer system configured to implement embodiments.

Referring to FIG. 6, a diagram illustrating in greater detail a computer system 600 on which aspects of the invention as described herein may be implemented according to various embodiments is depicted.

The computer system 600 can comprise a computing device such as a personal computer 620 includes one or more processing units 621, a system memory 622 and a system bus 623, which contains various system components, including a memory connected with the one or more processing units 621. In various embodiments, the processing units 621 can include multiple logical cores that are able to process information stored on computer readable media. The system bus 623 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 624 or volatile memory such as Random Access Memory (RAM) 625. The Basic Input/Output System (BIOS) 626 contains basic procedures ensuring transfer of information between the elements of personal computer 620, for example, during the operating system boot using ROM 624.

Personal computer 620, in turn, has a hard drive 627 for data reading and writing, a magnetic disk drive 628 for reading and writing on removable magnetic disks 629, and an optical drive 630 for reading and writing on removable optical disks 631, such as CD-ROM, DVD-ROM and other optical media. The hard drive 627, the magnetic drive 628, and the optical drive 630 are connected with system bus 623 through a hard drive interface 632, a magnetic drive interface 633 and an optical drive interface 634, respectively. The drives and the corresponding computer information media represent energy-independent means for storage of computer instructions, data structures, program modules and other data on personal computer 620.

The system depicted includes hard drive 627, a removable magnetic drive 629 and a removable optical drive 630, but it should be understood that it is possible to use other types of computer media, capable of storing data in a computer-readable form (solid state drives, flash memory cards, digital disks, random-access memory (RAM), etc.), connected to system bus 623 through a controller 655.

The computer 620 comprises a file system 636, where the recorded operating system 635 is stored, as well as additional program applications 637, other program engines 638 and program data 639. The user can input commands and information into the personal computer 620 using input devices (keyboard 640, mouse 642). Other input devices (not shown) can also be used, such as: a microphone, a joystick, a game console, a scanner, etc. Such input devices are usually connected to the computer system 620 through a serial port 646, which, in turn, is connected to a system bus, but they can also be connected in a different way—for example, using a parallel port, a game port or a Universal Serial Bus (USB). The monitor 647 or another type of display device is also connected to system bus 623 through an interface, such as a video adapter 648. In addition to monitor 647, personal computer 620 can be equipped with other peripheral output devices (not shown), such as speakers, a printer, etc.

Personal computer 620 is able to work in a network environment; in this case, it uses a network connection with one or several other remote computers 649. Remote computer(s) 649 is (are) similar personal computers or servers, which have most or all of the above elements, noted earlier when describing the substance of personal computer 620 shown in FIG. 6. The computing network can also have other devices, such as routers, network stations, peering devices or other network nodes.

Network connections can constitute a Local Area Network (LAN) 650 and a World Area Network (WAN). Such networks are used in corporate computer networks or in corporate intranets, and usually have access to the Internet. In LAN or WAN networks, personal computer 620 is connected to the Local Area Network 650 through a network adapter or a network interface 651. When using networks, personal computer 620 can use a modem 654 or other means for connection to a world area network, such as the Internet. Modem 654, which is an internal or an external device, is connected to system bus 623 through serial port 646. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for detecting malicious code for a functionally-restricted website-related application launched without installation on a mobile device, the system comprising:
 a computing platform including computing hardware of at least one processor and memory operably coupled to the at least one processor;
 instructions that, when executed on the computing platform, cause the computing platform to implement:
  a detection tool configured to—
   detect activity of an operating system (OS) service related to the functionally-restricted web site-related application launched without installation, and
   determine at least one parameter of the functionally-restricted website-related application launched without installation;
  a determination tool configured to—
   receive the at least one parameter of the functionally-restricted website-related application launched without installation from the detection tool, and
   determine a corresponding fully-functional application requiring installation based on the at least one parameter of the functionally-restricted web site-related application launched without installation;
  a check tool configured to—
   receive information about the corresponding fully-functional application requiring installation from the determination tool,
   check for malicious code in the corresponding fully-functional application requiring installation from the determination tool based on the information received from the determination tool, and
   stop the launch of the functionally-restricted website-related application when the check for malicious code identifies malicious code.

2. The system of claim 1, wherein detecting activity includes detecting an event showing a change in a system display.

3. The system of claim 2, wherein determining the at least one parameter includes checking a name of the detected event using a URL_view or App_name field.

4. The system of claim 1, wherein the at least one parameter of the functionally-restricted website-related application launched without installation is at least one of a filename of a file storing resources for the functionally-restricted website-related application launched without installation, a URL of the website related to the functionally-restricted website-related application launched without installation, or a filename of a container file of the functionally-restricted website-related application launched without installation.

5. The system of claim 1, wherein the detection tool is further configured to suspend launch of the functionally-restricted website-related application launched without installation.

6. The system of claim 5, wherein the detection tool suspends launch of the functionally-restricted website-related application launched without installation by simulating user selection of a home key on the mobile device.

7. The system of claim 1, wherein determining the corresponding fully-functional application requiring installation includes analyzing an assetlinks.json file of the website related to the functionally-restricted website-related application launched without installation by:
 searching the assetlinks.json file for all container file names related to the website; and
 accessing a container file body and files of all versions of the corresponding fully-functional application requiring installation in an applications database by at least one of the container file names.

8. The system of claim 1, wherein the check for malicious code is conducted in all files and all resources related to the corresponding fully-functional application requiring installation.

9. The system of claim 1, wherein the check for malicious code is conducted for all files and all resources having an Application ID shared with the functionally-restricted website-related application and the corresponding fully-functional application.

10. The system of claim 1, wherein the check for malicious code is conducted by analyzing an assetlinks.json file of the website related to the functionally-restricted website-related application launched without installation for a change in relationship between the website and applications initiated by the website.

11. The system of claim 1, wherein the check tool stops the launch of the functionally-restricted website-related application launched without installation by deleting temporary data needed by the functionally-restricted website-related application.

12. The system of claim 1, wherein the detection tool, the determination tool, and the check tool are all executed on the mobile device.

13. The system of claim 1, wherein the detection tool is executed on the mobile device and the determination tool and the check tool are executed on a server operably coupled to the mobile device.

14. A method for detecting malicious code for a functionally-restricted website-related application launched without installation on a mobile device, the method comprising:
 detecting launch of the functionally-restricted website-related application;
 determining at least one parameter of the functionally-restricted website-related application launched without installation;
 determining a corresponding fully-functional application requiring installation based on the at least one parameter of the functionally-restricted website-related application launched without installation;
 checking for malicious code in the corresponding fully-functional application requiring installation; and
 stopping the launch of the functionally-restricted website-related application.

15. The method of claim 14, wherein stopping the launch of the functionally-restricted website-related application is conducted when the checking for malicious code identifies malicious code.

16. The method of claim 14, wherein stopping the launch of the functionally-restricted website-related application is conducted prior to checking for malicious code in the corresponding fully-functional application requiring installation, the method further comprising
 resuming the functionally-restricted website-related application when malicious code is not identified.

17. The method of claim 16, wherein stopping the launch of the functionally-restricted website-related application includes simulating user selection of a home key on the mobile device.

18. The method of claim 14, wherein detecting launch of the functionally-restricted website-related application launched without installation includes detecting an event showing a change in a system display.

19. A method of suspending a functionally-restricted website-related application launched without installation on a mobile device, the method comprising:
- detecting launch of the functionally-restricted website-related application on the mobile device;
- pausing the functionally-restricted website-related application including by deleting temporary data used by the functionally-restricted website-related application or simulating user selection of a home key on the mobile device;
- determining at least one characteristic of the functionally-restricted website-related application;
- resuming the functionally-restricted website-related application based on the determined at least one characteristic.

\* \* \* \* \*